Oct. 30, 1962 J. F. SCHAFFNER 3,061,104
FUEL TANK OUTLET SHIELD
Filed Aug. 17, 1959
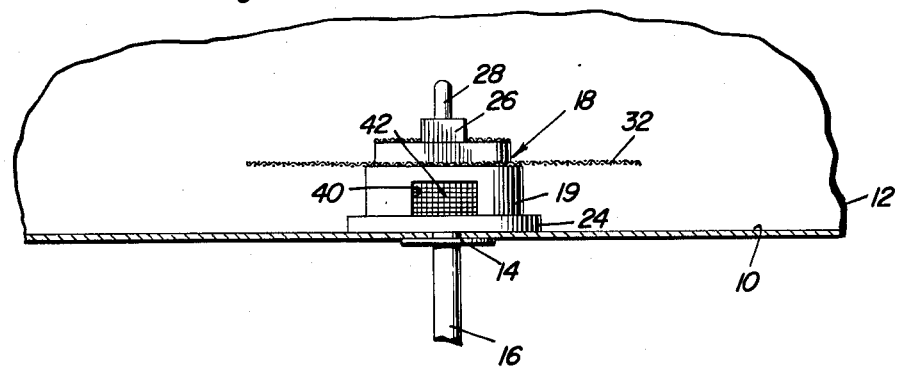
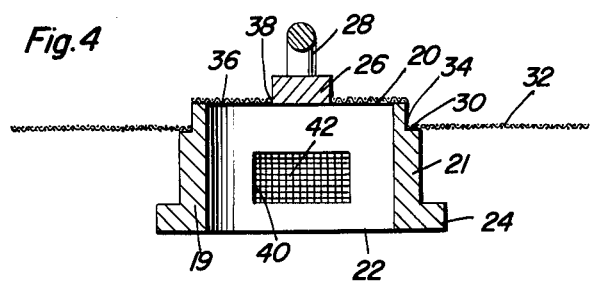
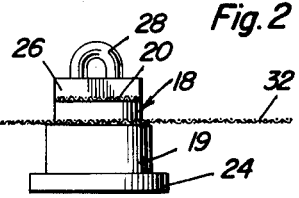
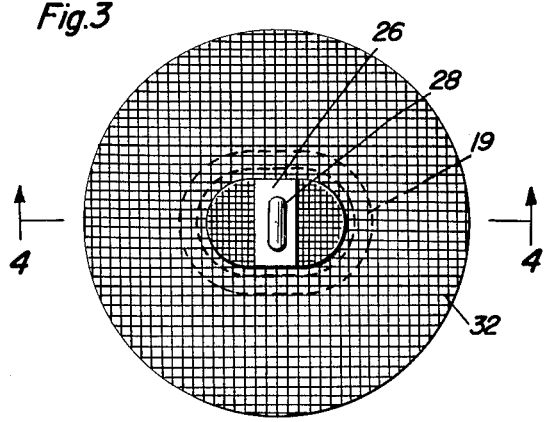
John F. Schaffner
INVENTOR.

United States Patent Office 3,061,104
Patented Oct. 30, 1962

3,061,104
FUEL TANK OUTLET SHIELD
John F. Schaffner, R.R. 1, Trempealeau, Wis.
Filed Aug. 17, 1959, Ser. No. 834,339
5 Claims. (Cl. 210—172)

This invention relates to filters and more particularly to a filter adapted to be used in a tank.

Under normal operating conditions of equipment using liquid fuel, for instance a tractor or any other vehicle or comparatively stationary equipment, foreign matter such as paper, seeds, bugs, gravel, etc. eventually find their way into the fuel line curvatures or other places such as joints, elbows, valves and so forth, and cause fuel stoppage or fuel reduction to the point where the engine becomes fuel starved.

The object of this invention is to provide a device to prevent such stoppage.

Another object of the invention is to provide an easily applied filter which excludes an exceedingly high percentage of foreign matter from the fuel line, the filter being installed by insertion in the filler opening of the fuel tank and by mere placement over the fuel line opening in the tank.

Briefly, the filter is made of a magnetic body having a novel array of screened openings by which to prevent foreign matter from entering the fuel line opening, keeping all of the foreign matter in the fuel tank.

Inasmuch as the body of the filter is made of magnetic substance, no special clamps or fasteners are required to hold the filter in place. It is merely located, and the magnetic attraction between the body of the filter and the wall of the fuel tank holds the filter in place.

Instead of having the entire body made of magnetized substance, it is within the purview of the invention to have a body of non-magnetized material, and an attached magnet on the body to serve the gripping function. This is but one of numerous variations that may be resorted to without departing from the invention. The drawing shows but one possible embodiment of the invention and is for illustrative purposes only.

In the drawing:

FIGURE 1 is a fragmentary sectional view of a typical fuel tank equipped with a fuel line and a filter in accordance with the invention positioned over the opening in the fuel tank with which the fuel line is registered.

FIGURE 2 is an elevational view of the filter.

FIGURE 3 is a top view of the filter.

FIGURE 4 is a sectional view taken on the line 4—4 of FIGURE 3.

In the accompanying drawing there is illustrated a wall 10 of a fuel tank 12, this diagrammatically representing any type of liquid fuel tank. Wall 10 has a fuel line opening 14 with which fuel line 16 is registered. The fuel line is connected in place by conventional fastening means and is unaltered by the existence and use of filter 18.

Filter 18 is made of an essentially cylindrical body 19 having an open upper end 20 and an open lower end 22. There is a cylindrical flange 24 around the open end 22 of body 19, and in the illustrated form of the invention, the entire body 19 is made of magnetized substance.

A bridge bar 26 extends across the open end 20 of body 19 and is secured in place. Eye 28 is connected with ridge bar 26 intermediate the ends thereof and is used with a grappling tool of any type for facilitating the insertion of filter 18 within tank 12 and the placement thereof over the opening 14 as shown in FIGURE 1. Inasmuch as the filter is especially designed to be used with existing gasoline or other types of fuel tanks, eye 28 is important because it allows the person installing the filter to grip the filter with a grappling tool, for example a pair of pliers or tongs, and slip it through the filter opening in tank 12 and lower the open end 22 of body 19 concentrically over opening 14.

There is a shoulder 30 near the upper end of the side wall 21 of body 19. As shown in FIGURE 3 the body is oval in shape, although the configuration may be altered. With an oval body, the circular screen 32 will have an oval shaped central opening 34 so that it may be slipped over the upper part of the body 19 and seated upon shoulder 30. The oval shape is of further significance because it enables the screen 32 which may be made of any type of hardware cloth including metal or plastic, to be rolled around the body 19 thereby reducing the overall diameter of filter 18 for insertion through the filler opening in the fuel tank. After insertion the inherent resilience of the screen 32 will return it to an essentially planar position as shown in FIGURE 1.

Filter screen 36 is made with a central opening 38 to fit over the bridge bar 26. The filter screen covers the otherwise open end 20 of body 19 to allow fuel to enter the body by way of the open end 20. One or more openings 40 are in the side wall 21 of body 19, and these are covered with filter screens 42. By having a multiplicity of fuel inlet openings such as at 20 and 40 in body 19, there is little or no likelihood of all of the fuel openings becoming clogged simultaneously. Yet, they will function to screen out the large foreign objects which enter the fuel tank 12. The screen 32 acts as a baffle and screen for the fuel which flows downwardly toward openings 40 and also holds large objects, for instance pieces of paper, upwardly or in an elevated position with reference to openings 40, tending to keep them from becoming completely blocked by a single sheet or a piece of paper.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A filter for the outlet opening of a fuel tank comprising a hollow body having an open end adapted to overlie the inner surfaces of said tank about said outlet opening, at least a portion of said body being of magnetic material whereby said body may be magnetically secured over said outlet opening and to the internal surfaces tank about said outlet opening, said body having an inlet opening in the other end and additional ingress openings formed in the sides of said body for the ingress of fuel thereinto, baffle means comprising a perforated screen-like sheet of flexible and resilient material carried by said other end of said body and projecting transversely thereof and outwardly beyond all sides of said body whereby it will be very unlikely that all of said inlet and ingress openings could be simultaneously completely blocked by a sheet of flexible hard material such as a leaf or a piece of paper in said fuel tank, at least portions of said ingress openings being disposed between said open end of said body and said sheet of flexible and resilient material, said ingress openings being adapted to have screening material associated therewith for filtering the fuel passing through the ingress openings.

2. The combination of claim 1 wherein each of said ingress openings is provided with a screening restricting the passage of large particles of foreign material through said ingress openings.

3. The combination of claim 1 including a bridge bar carried by said other end of said body and extending across and dividing the ingress opening formed therein into a plurality of distinct portions projecting outwardly of the screening therefor whereby it will be very unlikely that said divided opening could be completely blocked by a single sheet of flexible foreign material disposed in said tank.

4. The combination of claim 3 including means by which to facilitate installation of said body into said tank including an eye carried by said bridge bar and projecting from the side of said bar remote from said body.

5. The combination of claim 4 wherein at least two of said ingress openings are formed in opposite sides of said body.

References Cited in the file of this patent

UNITED STATES PATENTS

| | | |
|---|---|---|
| 712,336 | Rudner | Oct. 28, 1902 |
| 1,135,900 | Hughson | Apr. 13, 1915 |
| 2,066,364 | Rafton | Jan. 5, 1937 |
| 2,312,556 | Jepson | Mar. 2, 1943 |
| 2,512,877 | Rike | June 27, 1950 |

FOREIGN PATENTS

| | | |
|---|---|---|
| 189,851 | Austria | May 10, 1957 |
| 1,023,506 | France | Mar. 19, 1953 |